United States Patent
Hoshi (10) Patent No.: US 10,865,463 B2
(45) Date of Patent: Dec. 15, 2020

(54) USEFUL METHOD FOR SEPARATING LIGHT RARE EARTH ELEMENTS AND HEAVY RARE EARTH ELEMENTS

(71) Applicant: HITACHI METALS, LTD., Tokyo (JP)

(72) Inventor: Hiroyuki Hoshi, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 330 days.

(21) Appl. No.: 15/754,700

(22) PCT Filed: Aug. 25, 2016

(86) PCT No.: PCT/JP2016/074891
§ 371 (c)(1),
(2) Date: Feb. 23, 2018

(87) PCT Pub. No.: WO2017/034009
PCT Pub. Date: Mar. 2, 2017

(65) Prior Publication Data
US 2018/0245181 A1 Aug. 30, 2018

(30) Foreign Application Priority Data

Aug. 26, 2015 (JP) ................................. 2015-167079
Mar. 28, 2016 (JP) ................................. 2016-064774

(51) Int. Cl.
*C22B 59/00* (2006.01)
*C22B 3/10* (2006.01)
(Continued)

(52) U.S. Cl.
CPC .............. *C22B 59/00* (2013.01); *C01F 17/10* (2020.01); *C22B 3/065* (2013.01); *C22B 3/10* (2013.01);
(Continued)

(58) Field of Classification Search
CPC . C22B 3/00; C22B 3/0004–0098; C22B 3/04; C22B 3/06; C22B 3/065;
(Continued)

(56) References Cited

U.S. PATENT DOCUMENTS 5,728,355 A * 3/1998 Asada .................... C01F 17/265
423/21.1
6,093,376 A * 7/2000 Moore ..................... C01F 17/10
423/21.5
(Continued)

FOREIGN PATENT DOCUMENTS

CN 1078751 A 11/1993
CN 1156761 A 8/1997
(Continued)

OTHER PUBLICATIONS

Binnemans et al, Recycling of rare earths: a critical review, 2013. Journal of Cleaner Production, vol. 51, pp. 1-22 (Year: 2013).*
(Continued)

*Primary Examiner* — Keith Walker
*Assistant Examiner* — Benjamin C Anderson
(74) *Attorney, Agent, or Firm* — Kratz, Quintos & Hanson, LLP (57) ABSTRACT

A method for separating a light rare earth element and a heavy rare earth element includes at least the steps of: (1) obtaining, from a workpiece containing a light rare earth element and a heavy rare earth element, a composite oxide or mixture of oxides of the two; (2) dissolving the obtained composite oxide or mixture of oxides in hydrochloric acid and/or nitric acid; (3) adding a precipitant to the obtained solution to give a precipitate; (4) calcining the obtained precipitate; (5) adding the obtained calcine in an amount of 1.1 times to 3.0 times the upper solubility limit to hydrochloric acid and/or nitric acid having a concentration of 0.7 mol/L or more to give a solution and a residue; and (6) separating the obtained solution and residue, thereby giving the solution as a light rare earth element-rich inclusion and the residue as a heavy rare earth element-rich inclusion.

6 Claims, 3 Drawing Sheets

(51) Int. Cl.
  *C22B 3/44* (2006.01)
  *C22B 3/06* (2006.01)
  *C22B 3/20* (2006.01)
  *C01F 17/10* (2020.01)
  *C22B 7/00* (2006.01)

(52) U.S. Cl.
  CPC .................. *C22B 3/20* (2013.01); *C22B 3/44* (2013.01); *C22B 7/007* (2013.01); *Y02P 10/20* (2015.11)

(58) Field of Classification Search
  CPC .... C22B 3/10; C22B 3/20; C22B 3/22; C22B 3/44; C22B 7/006; C22B 7/007; C22B 7/00–04; C01F 17/00; C01F 17/10; Y02P 10/212–24
  USPC ........................................... 75/743; 423/21.1
  See application file for complete search history.

(56) References Cited

U.S. PATENT DOCUMENTS

| | | | | |
|---|---|---|---|---|
| 2014/0186239 A1* | 7/2014 | Hoshi | ....................... | B09B 5/00 423/21.1 |
| 2017/0022071 A1* | 1/2017 | Mudring | ................... | C22B 3/06 |

FOREIGN PATENT DOCUMENTS

| | | | |
|---|---|---|---|
| CN | 1077603 | C | 1/2002 |
| CN | 1675131 | A | 9/2005 |
| CN | 101012500 | A | 8/2007 |
| CN | 101633984 | A | 1/2010 |
| CN | 102011020 | A | 4/2011 |
| CN | 102660688 | A | 9/2012 |
| CN | 102703697 | A | 10/2012 |
| CN | 102719674 | A | 10/2012 |
| CN | 103540756 | A | 1/2014 |
| CN | 103717764 | A | 4/2014 |
| CN | 103917672 | A | 7/2014 |
| JP | 2002-080988 | A | 3/2002 |
| WO | 2012/149642 | A1 | 11/2012 |
| WO | 2014057922 | A1 | 4/2014 |
| WO | 2014/071510 | A1 | 5/2014 |

OTHER PUBLICATIONS

Lee et al, "Selective Leaching Process for Neodymium Recovery from Scrap Nd—Fe—B Magnet", 2013. Metallurgical and Materials Transactions A, vol. 44A, pp. 5825-5833 (Year: 2013).*
Office Action of Chinese Patent Application No. 201680048772.X dated Jul. 1, 2019 (7 sheets).
Extended European Search Report for European Patent Application No. 16839356.9 dated Mar. 25, 2019 (5 pages).
International Search Report for International Application No. PCT/JP2016/074891 dated Sep. 20, 2016 (1 Sheet).

* cited by examiner

USEFUL METHOD FOR SEPARATING LIGHT RARE EARTH ELEMENTS AND HEAVY RARE EARTH ELEMENTS

TECHNICAL FIELD

The present invention relates to a method useful for separating a light rare earth element and a heavy rare earth element from a workpiece containing a light rare earth element and a heavy rare earth element, such as an R—Fe—B based permanent magnet (R is a rare earth element). More specifically, the present invention relates to a method for obtaining a light rare earth element-rich inclusion and a heavy rare earth element-rich inclusion from a workpiece, which is useful for separating a light rare earth element and a heavy rare earth element contained in the workpiece by a solvent extraction method, for example.

BACKGROUND ART

As is widely known, R—Fe—B based permanent magnets have high magnetic characteristics and thus are used in various fields today. Against such a background, in R—Fe—B based permanent magnet production plants, large amounts of magnets are produced every day. However, with an increase in the amount of magnets produced, the amounts of magnet scrap discharged as a defectively processed product or the like, magnet processing waste discharged as cutting waste, grinding waste, or the like, etc., during the production process have also been increasing. In particular, with the weight and size reduction of information devices, the size of magnets used therein has also been reduced, leading to an increase in the proportion of processing allowance, and, as a result, the production yield tends to decrease year by year. Accordingly, rather than discarding magnet scrap, magnet processing waste, and the like discharged during the production process, how to recover and recycle metallic elements contained therein, particularly rare earth elements, is an important technical challenge for the future. The same also applies to how to recover rare earth elements from electrical appliances in which R—Fe—B based permanent magnets are used, etc., and recycle them as recyclable resources. The present inventor has been intensively working through this technical challenge. As a research outcome, he has proposed, in Patent Document 1, as a method for recovering a rare earth element from a workpiece containing a rare earth element and an iron group element, such as an R—Fe—B based permanent magnet, a method including subjecting a workpiece to an oxidation treatment, then turning the treatment environment into an environment where carbon is present, and subjecting an oxidation-treated workpiece to a heat treatment at a temperature of 1150° C. or more, whereby a rare earth element is separated in the form of an oxide from an iron group element and recovered.

The method proposed by the present inventor in Patent Document 1 is excellent as a recycling system that is required to be low-cost and simple. However, in the case where the workpiece is an R—Fe—B based permanent magnet, for example, an oxide of rare earth element separated from an iron group element and recovered is a composite oxide or mixture of oxides of a light rare earth element, such as Nd or Pr, and a heavy rare earth element, such as Dy. Accordingly, now that the excellent method for recovering a rare earth element from a workpiece containing a rare earth element and an iron group element has been provided in Patent Document 1, the next issue is how to separate a light rare earth element and a heavy rare earth element.

A common method known as a method for separating a light rare earth element and a heavy rare earth element uses a solvent extraction method (e.g., Patent Document 2). Currently, a solvent extraction method is positioned as a mainstream technique for the separation and purification of rare earth elements. However, the solvent extraction method requires to repeat the extraction operation over several stages using an organic phosphorus compound as an extractant, such as 2-ethylhexyl phosphonic acid mono-2-ethylhexyl ester, or a highly flammable organic solvent, such as kerosene. Thus, they are used in large amounts, and the apparatus is also large-sized. Accordingly, in terms of environmental protection and safety, it is required to reduce the amount of extractant or organic solvent used, and the downsizing of the apparatus is also required. In addition, in the solvent extraction method, it is necessary to set the treatment conditions according to the content ratio between a light rare earth element and a heavy rare earth element contained in a workpiece. Accordingly, in the case where the workpiece is, for example, a mixture of magnet processing wastes having various content ratios between a light rare earth element and a heavy rare earth element, and the content ratio between the two in the workpiece is unknown, work burden is imposed on the process in that the workpiece has to be analyzed each time to determine the content ratio between the two before setting the treatment conditions, or the concentration of each rare earth element has to be adjusted so that the content ratio between the two fits the existing treatment conditions.

PRIOR ART DOCUMENTS

Patent Document

Patent Document 1: WO 2013/018710
Patent Document 2: JP-A-H2-80530

SUMMARY OF THE INVENTION

Problems that the Invention is to Solve

Thus, an object of the present invention is to provide a method useful for separating a light rare earth element and a heavy rare earth element, which, for example, when a light rare earth element and a heavy rare earth element are separated from a workpiece containing a light rare earth element and a heavy rare earth element by a solvent extraction method, makes it possible to reduce the amount of extractant or organic solvent used or downsize the apparatus, or makes it possible to reduce the work burden on the process, such as the analysis of the content ratio between the light rare earth element and the heavy rare earth element contained in the workpiece.

Means for Solving the Problems

In light of the above points, the present inventor has conducted extensive research. As a result, he has found that when a composite oxide or mixture of oxides of a light rare earth element and a heavy rare earth element obtained from a workpiece containing a light rare earth element and a heavy rare earth element is dissolved in hydrochloric acid or nitric acid, then a precipitant is added, the resulting precipitate is calcined, and a predetermined amount of the obtained calcine is dissolved in hydrochloric acid or nitric acid having a predetermined concentration, a light rare earth element-rich inclusion can be obtained as an acid solution, while a heavy rare earth element-rich inclusion can be obtained as a dissolution residue, and that the content ratio between a light rare earth element and a heavy rare earth element contained in the acid solution, which is a light rare earth element-rich inclusion, falls within a certain range, even when the solutions have been obtained from workpieces having various content ratios between a light rare earth element and a heavy rare earth element.

A method for obtaining a light rare earth element-rich inclusion and a heavy rare earth element-rich inclusion from a workpiece containing a light rare earth element and a heavy rare earth element in order to separate the two of the present invention achieved in light of the above points is, as defined in claim 1, characterized by including at least:

(1) a step of obtaining, from a workpiece containing a light rare earth element and a heavy rare earth element, a composite oxide or mixture of oxides of the two;

(2) a step of dissolving the obtained composite oxide or mixture of oxides of a light rare earth element and a heavy rare earth element in hydrochloric acid and/or nitric acid;

(3) a step of adding a precipitant to the obtained solution to give a precipitate;

(4) a step of calcining the obtained precipitate;

(5) a step of adding the obtained calcine in an amount of 1.1 times to 3.0 times the upper solubility limit to hydrochloric acid and/or nitric acid having a concentration of 0.7 mol/L or more to give a solution and a residue; and (6) a step of separating the obtained solution and residue, thereby giving the solution as a light rare earth element-rich inclusion and the residue as a heavy rare earth element-rich inclusion (here, the term "rich" means that the content ratio of the concerned rare earth element to the other rare earth element is higher than the content ratio in the workpiece).

A method as defined in claim 2 is characterized in that in the method of claim 1, at least one member selected from oxalic acid, acetic acid, and a metal salt of carbonic acid is used as the precipitant.

A method as defined in claim 3 is characterized in that in the method of claim 1, the workpiece is an R—Fe—B based permanent magnet.

A method as defined in claim 4 is characterized in that in the method of claim 1, the content ratio between the light rare earth element and the heavy rare earth element contained in the workpiece (the weight of the heavy rare earth element/the weight of the light rare earth element) is 0.05 to 0.50.

A method as defined in claim 5 is characterized in that in the method of claim 1, the content ratio between a light rare earth element and a heavy rare earth element contained in the solution that serves as a light rare earth element-rich inclusion (the concentration of the heavy rare earth element/the concentration of the light rare earth element) is 0.02 to 0.05, and the content ratio is 0.01 or more smaller than the content ratio between the light rare earth element and the heavy rare earth element contained in the workpiece (the weight of the heavy rare earth element/the weight of the light rare earth element).

In addition, a method for obtaining a light rare earth element-rich inclusion and a heavy rare earth element-rich inclusion from a composite oxide or mixture of oxides of a light rare earth element and a heavy rare earth element in order to separate the two of the present invention is, as defined in claim 6, characterized by including at least:

(1) a step of dissolving a composite oxide or mixture of oxides of a light rare earth element and a heavy rare earth element in hydrochloric acid and/or nitric acid;

(2) a step of adding a precipitant to the obtained solution to give a precipitate;

(3) a step of calcining the obtained precipitate;

(4) a step of adding the obtained calcine in an amount of 1.1 times to 3.0 times the upper solubility limit to hydrochloric acid and/or nitric acid having a concentration of 0.7 mol/L or more to give a solution and a residue; and (5) a step of separating the obtained solution and residue, thereby giving the solution as a light rare earth element-rich inclusion and the residue as a heavy rare earth element-rich inclusion (here, the term "rich" means that the content ratio of the concerned rare earth element to the other rare earth element is higher than the content ratio in the composite oxide or mixture of oxides of a light rare earth element and a heavy rare earth element).

Effect of the Invention

The present invention can provide a method useful for separating a light rare earth element and a heavy rare earth element, which, for example, when a light rare earth element and a heavy rare earth element are separated from a workpiece containing a light rare earth element and a heavy rare earth element by a solvent extraction method, makes it possible to reduce the amount of extractant or organic solvent used or downsize the apparatus, or makes it possible to reduce the work burden on the process, such as the analysis of the content ratio between the light rare earth element and the heavy rare earth element contained in the workpiece.

MODE FOR CARRYING OUT THE INVENTION

The method for obtaining a light rare earth element-rich inclusion and a heavy rare earth element-rich inclusion from a workpiece containing a light rare earth element and a heavy rare earth element in order to separate the two of the present invention is characterized by including at least:

(1) a step of obtaining, from a workpiece containing a light rare earth element and a heavy rare earth element, a composite oxide or mixture of oxides of the two;

(2) a step of dissolving the obtained composite oxide or mixture of oxides of a light rare earth element and a heavy rare earth element in hydrochloric acid and/or nitric acid;

(3) a step of adding a precipitant to the obtained solution to give a precipitate;

(4) a step of calcining the obtained precipitate;

(5) a step of adding the obtained calcine in an amount of 1.1 times to 3.0 times the upper solubility limit to hydrochloric acid and/or nitric acid having a concentration of 0.7 mol/L or more to give a solution and a residue; and (6) a step of separating the obtained solution and residue, thereby giving the solution as a light rare earth element-rich inclusion and the residue as a heavy rare earth element-rich inclusion (here, the term "rich" means that the content ratio of the concerned rare earth element to the other rare earth element is higher than the content ratio in the workpiece). Hereinafter, the steps in the method of the present invention will be described one by one.

(1) Step of Obtaining, from Workpiece Containing Light Rare Earth Element and Heavy Rare Earth Element, Composite Oxide or Mixture of Oxides of Two First, the workpiece containing a light rare earth element and a heavy rare earth element to which the method of the present invention can be applied is not particularly limited as long as it contains a light rare earth element, such as Nd or Pr, and a heavy rare earth element, such as Dy or Tb. In addition to light rare earth elements and heavy rare earth elements, the workpiece may also contain iron group elements such as Fe, Co, and Ni, boron, and the like as additional elements. Specific examples include R—Fe—B based permanent magnets. The method for obtaining, from a workpiece containing a light rare earth element and a heavy rare earth element, a composite oxide or mixture of oxides of the two may be a method known per se. For example, the method described in Patent Document 1, which includes subjecting a workpiece containing a rare earth element and an iron group element to an oxidation treatment, then turning the treatment environment into an environment where carbon is present, and subjecting an oxidation-treated workpiece to a heat treatment at a temperature of 1150° C. or more, whereby a rare earth element is separated in the form of an oxide from an iron group element and recovered, can be suitably employed. In the composite oxide or mixture of oxides of a light rare earth element and a heavy rare earth element, the total of the light rare earth element content and the heavy rare earth element content is preferably 70 mass % or more, more preferably 75 mass % or more. The composite oxide or mixture of oxides of a light rare earth element and a heavy rare earth element may contain an iron group element, boron, and the like, but the contents thereof are each preferably 5.0 mass % or less, more preferably 2.5 mass % or less.

(2) Step of Dissolving Obtained Composite Oxide or Mixture of Oxides of Light Rare Earth Element and Heavy Rare Earth Element in Hydrochloric Acid and/or Nitric Acid Hydrochloric acid and nitric acid used in this step may each be used at a concentration or in a volume which can dissolve the composite oxide or mixture of oxides of a light rare earth element and a heavy rare earth element obtained in the previous step. Specifically, for example, hydrochloric acid or nitric acid having a concentration of 0.5 mol/L or more should be used in a proportion of 1 mL to 50 mL per g of the composite oxide or mixture of oxides of a light rare earth element and a heavy rare earth element. In terms of safety and the like, the upper limit of the concentration of hydrochloric acid or nitric acid used is 5.0 mol/L, for example. The dissolution temperature may be 20° C. to 85° C., for example. The dissolution time may be 1 hour to 3 days, for example. Incidentally, in order to efficiently dissolve the composite oxide or mixture of oxides of a light rare earth element and a heavy rare earth element, it is preferable that the composite oxide or mixture of oxides is ground into a granular or powder form having a particle size of 1 mm or less and then dissolved in hydrochloric acid or nitric acid. It is more preferable that grinding is performed to a particle size of 500 μm or less.

(3) Step of Adding Precipitant to Obtained Solution to Give Precipitate

Examples of precipitants usable in this step include oxalic acid, acetic acid, and a metal salt of carbonic acid (sodium carbonate, etc.). The composite oxide or mixture of oxides of a light rare earth element and a heavy rare earth element dissolved in hydrochloric acid or nitric acid in the previous step is converted into a precipitate composed of oxalates, acetates, or carbonates of a light rare earth element and a heavy rare earth element. A metal salt of oxalic acid, acetic acid, or carbonic acid may be used in such an amount that a precipitate composed of oxalates, acetates, or carbonates of a light rare earth element and a heavy rare earth element can be obtained. Specifically, a metal salt of oxalic acid, acetic acid, or carbonic acid should be used, for example, in a proportion of 0.8 g to 3.0 g per g of the composite oxide or mixture of oxides of a light rare earth element and a heavy rare earth element dissolved in hydrochloric acid or nitric acid in the previous step. The precipitation temperature may be 20° C. to 85° C., for example. The precipitation time may be 1 hour to 6 hours, for example.

(4) Step of Calcining Obtained Precipitate

Next, the precipitate composed of oxalates, acetates, or carbonates of a light rare earth element and a heavy rare earth element obtained in the previous step is calcined, and the oxalates, acetates, or carbonates of a light rare earth element and a heavy rare earth element are converted again into a composite oxide or mixture of oxides. In order to effectively obtain a light rare earth element-rich inclusion and a heavy rare earth element-rich inclusion, it is preferable that the precipitate is calcined at 500° C. to 1000° C. under an atmosphere where oxygen is present, such as ambient atmosphere, for example. The calcination temperature is more preferably 600° C. to 950° C., still more preferably 700° C. to 900° C. The calcination time may be 1 hour to 6 hours, for example.

(5) Step of Adding Obtained Calcine in Amount of 1.1 Times to 3.0 Times Upper Solubility Limit to Hydrochloric Acid and/or Nitric Acid Having Concentration of 0.7 Mol/L or More to Give Solution and Residue This step is a key step in the method of the present invention. What is important is that the calcine obtained in the previous step, that is, the composite oxide or mixture of oxides of a light rare earth element and a heavy rare earth element, has to be added to hydrochloric acid or nitric acid in such an amount that the composite oxide or mixture of oxides is not all dissolved in hydrochloric acid or nitric acid used, that is, the amount has to be greater than the upper solubility limit, and also that hydrochloric acid or nitric acid has to have a predetermined concentration or more. The present inventor has found that when the treatment conditions are set like this, the light rare earth element contained in the calcine tends to be dissolved in hydrochloric acid or nitric acid, while the heavy rare earth element tends to remain in the calcine. By utilizing such properties of light rare earth elements and heavy rare earth elements, a light rare earth element-rich inclusion and a heavy rare earth element-rich inclusion can be obtained as a solution and a residue, respectively. The reason why the lower limit of the amount of calcine added to hydrochloric acid or nitric acid is specified to be 1.1 times the upper solubility limit is that when the amount is less than 1.1 times the upper solubility limit, the heavy rare earth element contained in the calcine is likely to be dissolved in hydrochloric acid or nitric acid together with the light rare earth element. When the amount of calcine added to hydrochloric acid or nitric acid is not more than 1.0 time the upper solubility limit, the calcine is completely dissolved in hydrochloric acid or nitric acid. Thus, the light rare earth element and the heavy rare earth element contained in the calcine are all dissolved in hydrochloric acid or nitric acid (as a result, a light rare earth element-rich inclusion and a heavy rare earth element-rich inclusion cannot be obtained). The reason why the upper limit of the amount of calcine added to hydrochloric acid or nitric acid is specified to be 3.0 times the upper solubility limit is that when the amount is more than 3.0 times the upper solubility limit, much of the light rare earth element contained in the calcine is not dissolved in hydrochloric acid or nitric acid, and the light rare earth element is likely to remain in the calcine. As a result, a light rare earth element-rich inclusion and a heavy rare earth element-rich inclusion are unlikely to be obtained. In order to effectively obtain a light rare earth element-rich inclusion and a heavy rare earth element-rich inclusion, the amount of calcine added to hydrochloric acid or nitric acid is preferably 1.5 times to 2.9 times, more preferably 1.8 times to 2.8 times, the upper solubility limit. Incidentally, the upper solubility limit of the calcine in hydrochloric acid or nitric acid can be determined experimentally by dissolving the calcine little by little in hydrochloric acid or nitric acid used, or can also be determined by calculation (for example, because the amounts of metal elements other than light rare earth elements and heavy rare earth elements contained in the calcine, if any, are extremely small, considering the calcine as being composed only of a light rare earth element and a heavy rare earth element, based on the composition of the calcine, the upper solubility limit is calculated from the molar quantity of hydrogen ions supplied from hydrochloric acid or nitric acid used (there shall be no variation in the amount of supply due to the variation in pH) and the valence of each rare earth element. Although the upper solubility limit thus calculated is not precise, no trouble is caused in performing this step). The reason why the lower limit of the concentration of hydrochloric acid or nitric acid used is specified to be 0.7 mol/L is that when the concentration is less than 0.7 mol/L, the light rare earth element contained in the calcine is not dissolved in priority to the heavy rare earth element, and the heavy rare earth element is likely to be dissolved together with the light rare earth element. Incidentally, in terms of safety and the like, the upper limit of the concentration of hydrochloric acid or nitric acid used is 5.0 mol/L, for example. The temperature of hydrochloric acid or nitric acid to which the calcine is added may be 20° C. to 85° C., for example, and it is preferable that after the calcine is added, the mixture is stirred and maintained for 1 hour to 10 hours, for example.

(6) Step of Separating Obtained Solution and Residue, Thereby Giving Solution as Light Rare Earth Element-Rich Inclusion and Residue as Heavy Rare Earth Element-Rich Inclusion The solution obtained in the previous step has a high light rare earth element content (i.e., the content ratio of the light rare earth element to the heavy rare earth element is higher than the content ratio in the workpiece), and the residue has a high heavy rare earth element content (i.e., the content ratio of the heavy rare earth element to the light rare earth element is higher than the content ratio in the workpiece). Accordingly, by separating the solution and the residue by filtration, for example, a light rare earth element-rich inclusion can be obtained as a solution, while a heavy rare earth element-rich inclusion can be obtained as a residue. By subjecting the solution, which is a light rare earth element-rich inclusion, separated from the residue, which is a heavy rare earth element-rich inclusion, to a solvent extraction method by a method known per se, the light rare earth element and the heavy rare earth element contained in the solution can be separated. In this case, the solution, which is a light rare earth element-rich inclusion, has a higher light rare earth element content than the workpiece. Therefore, compared with the case where the workpiece itself is subjected to a solvent extraction method to separate a light rare earth element and a heavy rare earth element, the number of stages necessary for the extraction operation can be reduced, making it possible to reduce the amount of extractant or organic solvent used or downsize the apparatus. In addition, it is noteworthy that even when the content ratio between the light rare earth element and the heavy rare earth element contained in the workpiece (the weight of the heavy rare earth element/the weight of the light rare earth element) varies within a range of 0.05 to 0.50, for example, the content ratio between a light rare earth element and a heavy rare earth element contained in the solution, which is as a light rare earth element-rich inclusion, (the concentration of the heavy rare earth element/the concentration of the light rare earth element) falls within a range of 0.02 to 0.05 (provided that the content ratio is 0.01 or more smaller than the content ratio between the light rare earth element and the heavy rare earth element contained in the workpiece (the weight of the heavy rare earth element/the weight of the light rare earth element)). Therefore, when the workpiece is such that the content ratio between a light rare earth element and a heavy rare earth element contained therein (the weight of the heavy rare earth element/the weight of the light rare earth element) is within a range of 0.05 to 0.50 (the weight ratio between the two in an R—Fe—B based permanent magnet is within this range), for example, without analyzing the workpiece each time to determine the content ratio between the two, a light rare earth element and a heavy rare earth element contained in the solution can be separated under the treatment conditions that fit the content ratio falling within the above range. Incidentally, by subjecting the residue, which is a heavy rare earth element-rich inclusion, separated from the solution, which is a light rare earth element-rich inclusion, to the steps (2) to (6), for example, the amount of light rare earth element contained in the residue can be reduced (the content ratio of the heavy rare earth element to the light rare earth element can be further increased). In this case, as described above, by subjecting the solution, which is a light rare earth element-rich inclusion, separated from the residue, which is a heavy rare earth element-rich inclusion, to a solvent extraction method by a method known per se, the light rare earth element and the heavy rare earth element contained in the solution can be separated.

EXAMPLES

Hereinafter, the present invention will be described in detail with reference to the examples. However, the present invention should not be construed as being limited to the following descriptions.

Example 1: Separation of Light Rare Earth Elements (Nd, Pr) and Heavy Rare Earth Element (Dy) (No. 1)

(Step 1)

Magnet processing waste having a particle size of about 10 μm produced during the R—Fe—B based permanent magnet production process (stored in water for 7 days to prevent spontaneous ignition) was dehydrated by suction filtration, and then subjected to an oxidation treatment by burning treatment using a rotary kiln. The results of ICP analysis of the magnet processing waste thus oxidation-treated (apparatus used: ICPV-1017 manufactured by Shimadzu Corporation) are shown in Table 1.

TABLE 1

|  | Fe | Nd | Pr | Dy | B | Remainder |
|---|---|---|---|---|---|---|
| Oxidation-Treated Magnet Processing Waste | 49.0 | 15.9 | 4.5 | 2.8 | 0.7 | 27.1 |

(Unit: mass %)

Next, 50 g of the oxidation-treated magnet processing waste was mixed with 10 g of carbon black (furnace black manufactured by Tokai Carbon Co., Ltd.; same hereinafter), and placed in a carbon crucible (made of black lead) having a dimension of 50 mm in inner diameter×50 mm in depth×10 mm in thickness with its bottom previously covered with 10 g of carbon black. Subsequently, using an electric furnace, the temperature was raised to 1450° C. at 10° C./min in an industrial argon gas atmosphere (oxygen content: 0.2 ppm, flow rate: 10 L/min; same hereinafter), followed by a heat treatment for 1 hour. Subsequently, heating in the furnace was stopped, and, while maintaining the industrial argon gas atmosphere in the furnace, the carbon crucible was furnace-cooled to room temperature. After the completion of furnace cooling, in the carbon crucible, two kinds of masses (mass A and mass B) were present independently of but in close contact with each other. The mass A and the mass B were each subjected to SEM-EDX analysis (apparatus used: S800 manufactured by Hitachi High-Technologies Corporation; same hereinafter). As a result, the main component of the mass A was iron, while the main component of the mass B was an oxide of rare earth element. The results of SEM-EDX analysis of the mass B are shown in Table 2 (only Nd, Pr, and Dy) (iron was equal to or below the detection limit; same hereinafter). Incidentally, X-ray diffraction analysis was separately performed (apparatus used: D8 ADVANCE manufactured by Bruker AXS; same hereinafter) to confirm that the oxide of rare earth element, which is a main component of the mass B, was a composite oxide or mixture of oxides of light rare earth elements (Nd, Pr) and a heavy rare earth element (Dy).

TABLE 2

|  | Nd | Pr | Dy |
|---|---|---|---|
| Mass B | 49.4 | 14.0 | 16.9 |

(Unit: mass %)

(Step 2)

The mass B containing the oxide of rare earth element as a main component obtained in step 1 was ground with a mortar and a pestle made of agate, and a powder having a particle size of less than 125 μm was obtained using a screen made of stainless steel; this operation was performed several times, thereby preparing about 1 kg of a powder of the mass B. 75 g of the powder of the mass B thus prepared was added to 1 L of hydrochloric acid having a concentration of 1.0 mol/L and stirred at 80° C. for 6 hours, and then the residue was filtered to give a hydrochloric acid solution of the mass B.

(Step 3)

130 g of oxalic acid dihydrate was added to 1 L of the hydrochloric acid solution of the mass B obtained in step 2, and stirred at room temperature for 2 hours to give about 100 g of a white powdery precipitate having a high moisture content (oxalates of light rare earth elements and a heavy rare earth element).

(Step 4)

The precipitate obtained in step 3 was placed in an alumina crucible and calcined under ambient atmosphere at 900° C. for 2 hours to give 65.5 g of a brown calcine. The results of SEM-EDX analysis of this calcine are shown in Table 3 (only Nd, Pr, and Dy). Incidentally, X-ray diffraction analysis was separately performed to confirm that this calcine was a composite oxide or mixture of oxides of light rare earth elements and a heavy rare earth element.

TABLE 3

|  | Nd | Pr | Dy |
|---|---|---|---|
| Calcine | 54.3 | 15.0 | 14.3 |

(Unit: mass %)

(Step 5)

To 100 mL of hydrochloric acid having a concentration of 1.0 mol/L heated to 60° C., the calcine obtained in step 4 was added in an amount equivalent to 1.1 times to 1.5 times the upper solubility limit and stirred. Incidentally, the upper solubility limit of the calcine obtained in step 4 in hydrochloric acid used (6.55 g) was determined experimentally by dissolving the calcine in hydrochloric acid little by little.

(Step 6)

Figure 1:
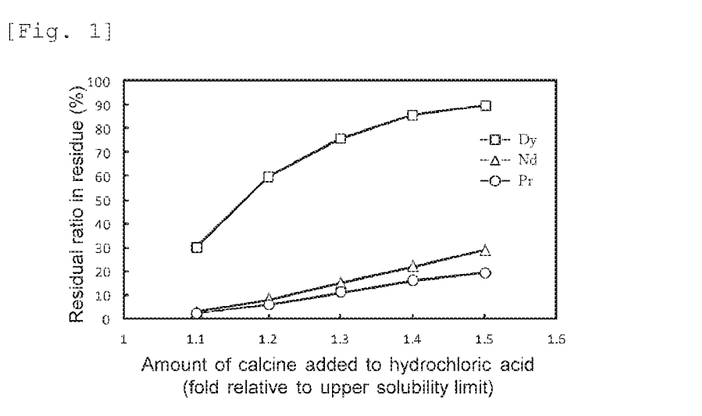
FIG. 1 A graph showing the residual ratios of light rare earth elements (Nd, Pr) and a heavy rare earth element (Dy) in a residue in Example 1.
Figure 2:
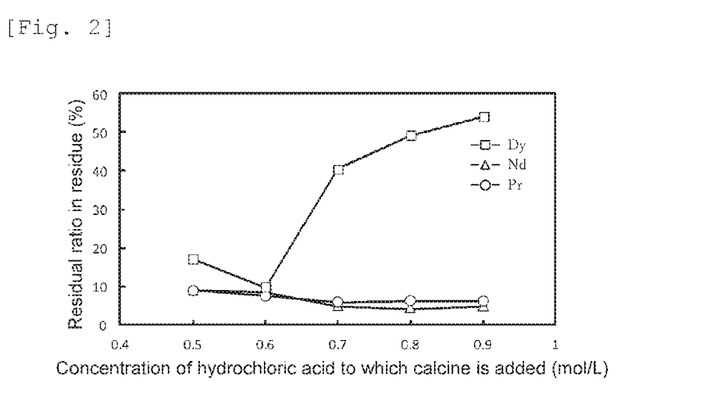
FIG. 2 Similarly, a graph showing the influence of the concentration of hydrochloric acid to which a calcine is added on the separability between light rare earth elements and a heavy rare earth element in Example 1.

2 hours later from the start of stirring in step 5, the residue was filtered, thereby separating the hydrochloric acid solution and the residue. 13 g of oxalic acid dihydrate was added to 100 mL of the obtained hydrochloric acid solution and stirred at room temperature for 2 hours to give a white precipitate, and this precipitate was calcined under ambient atmosphere at 900° C. for 2 hours to give a calcine. In addition, the obtained residue was calcined under ambient atmosphere at 900° C. for 2 hours to give a calcine. Table 4 and Table 5 show the weight of each of the calcine derived from hydrochloric acid solution and the calcine derived from residue together with the results of SEM-EDX analysis (only Nd, Pr, and Dy). In addition, from the amount of each rare earth element contained in the calcine derived from hydrochloric acid solution (a) calculated by multiplying the weight of the calcine derived from hydrochloric acid solution by the content ratio determined by SEM-EDX analysis, and form the amount of each rare earth element contained in the calcine derived from residue (b) calculated by multiplying the weight of the calcine derived from residue by the content ratio determined by SEM-EDX analysis, the residual ratio of each rare earth element in the residue $((b/(a+b))\times 100)$ was examined. The results (the amount of each rare earth element contained in the calcine derived from residue is equivalent to the amount of each rare earth element contained in the residue) are shown in FIG. 1 (in the figure, Δ, ○, and □ represent Nd, Pr, and Dy, respectively).

residue in the same manner as above (the calcine used is from a different lot) using various concentrations of hydrochloric acid of the same volume with the amount of calcine added being set at 1.1 times the upper solubility limit in each hydrochloric acid. The results are shown in FIG. 2 (in the figure, Δ, ○, and □ represent Nd, Pr, and Dy, respectively). As is clear from FIG. 2, in the case where hydrochloric acid having a concentration of 0.6 mol/L was used, together with the light rare earth elements, the heavy rare earth element was also dissolved, and it was not possible to obtain a light rare earth element-rich inclusion and a heavy rare earth element-rich inclusion. However, with an increase in the concentration of hydrochloric acid, improvement in the separability between light rare earth elements and a heavy rare earth element resulting from improvement in the residual ratio of the heavy rare earth element in the residue

TABLE 4

| | Amount of Calcine obtained in Step 4 added in Step 5 (Number in parenthesis indicates fold relative to upper solubility limit) | Weight of Calcine derived from Hydrochloric Acid Solution | SEM-EDX Analysis Results (Unit: mass %) | | |
|---|---|---|---|---|---|
| | | | Nd | Pr | Dy |
| Calcine derived from Hydrochloric Acid Solution | 7.20 g (1.1-fold) | 6.41 g | 56.1 | 16.1 | 12.0 |
| | 7.85 g (1.2-fold) | 6.12 g | 58.1 | 16.8 | 8.5 |
| | 8.51 g (1.3-fold) | 5.99 g | 59.5 | 18.3 | 6.4 |
| | 9.16 g (1.4-fold) | 5.75 g | 60.7 | 19.0 | 4.4 |
| | 9.82 g (1.5-fold) | 5.54 g | 61.4 | 19.6 | 3.6 |

TABLE 5

| | Amount of Calcine obtained in Step 4 added in Step 5 (Number in parenthesis indicates fold relative to upper solubility limit) | Weight of Calcine derived from Residue | SEM-EDX Analysis Results (Unit: mass %) | | |
|---|---|---|---|---|---|
| | | | Nd | Pr | Dy |
| Calcine derived from Residue | 7.20 g (1.1-fold) | 0.55 g | 20.3 | 4.4 | 60.5 |
| | 7.85 g (1.2-fold) | 1.35 g | 22.5 | 4.9 | 57.7 |
| | 8.51 g (1.3-fold) | 2.27 g | 27.8 | 5.9 | 53.4 |
| | 9.16 g (1.4-fold) | 3.07 g | 31.6 | 6.8 | 50.1 |
| | 9.82 g (1.5-fold) | 3.86 g | 35.5 | 6.8 | 45.6 |

As is clear from Table 4, Table 5, and FIG. 1, it turned out that in the hydrochloric acid solution obtained in step 5, Nd and Pr, which are light rare earth elements, are contained in large amounts, while in the residue, Dy, which is a heavy rare earth element, is contained in a large amount, and also that by separating the hydrochloric acid solution and the residue, a light rare earth element-rich inclusion and a heavy rare earth element-rich inclusion can be obtained as the hydrochloric acid solution and the residue, respectively. In addition, with an increase in the amount of the calcine obtained in step 4 added in step 5, the residual ratio of the heavy rare earth element in the residue improved. However, improvement in the residual ratio almost reached a plateau when the amount added was increased to 1.5 times the upper solubility limit, and the improved residual ratio was almost maintained at least until when the amount added was increased to 2.0 times the upper solubility limit. The influence of the concentration of hydrochloric acid to which a calcine is added on the separability between light rare earth elements and a heavy rare earth element was evaluated by examining the residual ratio of each rare earth element in the residue was observed, and such improved separability was observed also in the case of using hydrochloric acid having a concentration of 2.0 mol/L. Incidentally, the difference in the temperature of hydrochloric acid in step 5 showed no difference in the separability between light rare earth elements and a heavy rare earth element (temperature range: 20° C. to 85° C.). In addition, even when the stirring time in step 5 was made longer than 2 hours, no improvement was observed in the separability between light rare earth elements and a heavy rare earth element.

Example 2: Separation of Light Rare Earth Elements (Nd, Pr) and Heavy Rare Earth Element (Tb) (Model Experiment)

75 g of a didymium oxide having an Nd content of 62.5 mass % and a Pr content of 17.8 mass % (based on SEM-EDX analysis) was added to 1 L of hydrochloric acid having a concentration of 1.0 mol/L and stirred at 80° C. for 6 hours, and then the residue was filtered to give a hydrochloric acid solution of didymium. In addition, 10 g of a Tb$_4$O$_7$ reagent was added to 100 mL of hydrochloric acid having a concentration of 1.0 mol/L and stirred at 80° C. for 6 hours, and then the residue was filtered to give a hydrochloric acid solution of Tb. Using 1 L of a hydrochloric acid solution prepared by mixing the hydrochloric acid solution of didymium and the hydrochloric acid solution of Tb in a volume ratio of 9:1, the same steps as step 3 to step 6 of Example 1 were performed, thereby separating a hydrochloric acid solution and a residue. Table 6 shows the results of SEM-EDX analysis of the calcine obtained in the step equivalent to step 4 of Example 1 (only Nd, Pr, and Tb). Incidentally, X-ray diffraction analysis was separately performed to confirm that this calcine was a composite oxide or mixture of oxides of light rare earth elements and a heavy rare earth element.

TABLE 6

|  | Nd | Pr | Tb |
|---|---|---|---|
| Calcine | 59.9 | 16.5 | 7.2 |

(Unit: mass %)

Figure 3:
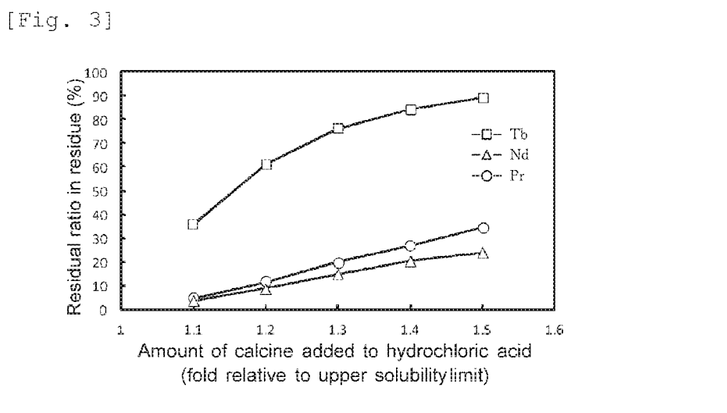
FIG. 3 A graph showing the residual ratios of light rare earth elements (Nd, Pr) and a heavy rare earth element (Tb) in a residue in Example 2.
Figure 4:
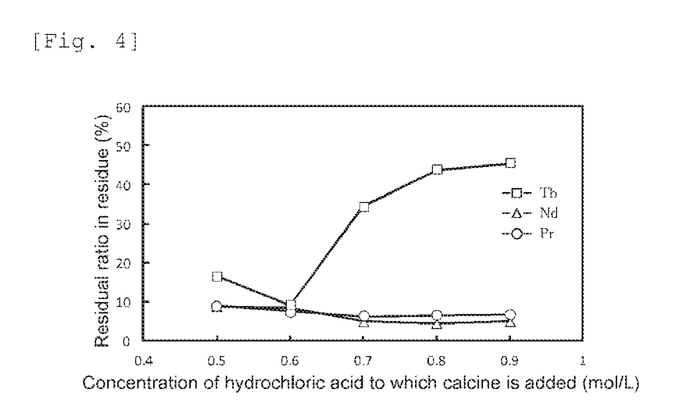
FIG. 4 Similarly, a graph showing the influence of the concentration of hydrochloric acid to which a calcine is added on the separability between light rare earth elements and a heavy rare earth element in Example 2.

From the obtained hydrochloric acid solution and residue, a calcine derived from solution and a calcine derived from residue were obtained in the same manner as in Example 1. The weight of each of the calcine derived from hydrochloric acid solution and the calcine derived from residue were measured, and also SEM-EDX analysis was performed. Then, from the amount of each rare earth element contained in the calcine derived from hydrochloric acid solution (a) calculated by multiplying the weight of the calcine derived from hydrochloric acid solution by the content ratio determined by SEM-EDX analysis, and from the amount of each rare earth element contained in the calcine derived from residue (b) calculated by multiplying the weight of the calcine derived from residue by the content ratio determined by SEM-EDX analysis, the residual ratio of each rare earth element in the residue ((b/(a+b))×100) was examined. The results (the amount of each rare earth element contained in the calcine derived from residue is equivalent to the amount of each rare earth element contained in the residue) are shown in FIG. 3 (in the figure, Δ, ○, and □ represent Nd, Pr, and Tb, respectively). As is clear from FIG. 3, it turned out that in the residue, Tb, which is a heavy rare earth element, is contained in a large amount, while in the hydrochloric acid solution, Nd and Pr, which are light rare earth elements, are contained in large amounts (separately confirmed), and also that by separating the hydrochloric acid solution and the residue, a light rare earth element-rich inclusion and a heavy rare earth element-rich inclusion can be obtained as the hydrochloric acid solution and the residue, respectively. In addition, with an increase in the amount of calcine added to hydrochloric acid, the residual ratio of the heavy rare earth element in the residue improved. However, improvement in the residual ratio almost reached a plateau when the amount added was increased to 1.5 times the upper solubility limit, and the improved residual ratio was almost maintained at least until when the amount added was increased to 2.0 times the upper solubility limit. The influence of the concentration of hydrochloric acid to which a calcine is added on the separability between light rare earth elements and a heavy rare earth element was evaluated by examining the residual ratio of each rare earth element in the residue in the same manner as above (the calcine used is from a different lot) using various concentrations of hydrochloric acid of the same volume with the amount of calcine added being set at 1.1 times the upper solubility limit in each hydrochloric acid. The results are shown in FIG. 4 (in the figure, Δ, ○, and □ represent Nd, Pr, and Tb, respectively). As is clear from FIG. 4, in the case where hydrochloric acid having a concentration of 0.6 mol/L was used, together with the light rare earth elements, the heavy rare earth element was also dissolved, and it was not possible to obtain a light rare earth element-rich inclusion and a heavy rare earth element-rich inclusion. However, with an increase in the concentration of hydrochloric acid, improvement in the separability between light rare earth elements and a heavy rare earth element resulting from improvement in the residual ratio of the heavy rare earth element in the residue was observed, and such improved separability was observed also in the case of using hydrochloric acid having a concentration of 2.0 mol/L. Incidentally, the difference in the temperature of hydrochloric acid showed no difference in the separability between light rare earth elements and a heavy rare earth element (temperature range: 20° C. to 85° C.). In addition, even when the stirring time was made longer than 2 hours, no improvement was observed in the separability between light rare earth elements and a heavy rare earth element.

Example 3: Separation of Light Rare Earth Elements (Nd, Pr) and Heavy Rare Earth Element (Dy) (No. 2)

The same experiment as in Example 1 was performed, except that nitric acid having a concentration of 1.1 mol/L was used in place of hydrochloric acid having a concentration of 1.0 mol/L used in step 2 and step 5 of Example 1. As a result, as in Example 1, it was possible to obtain a light rare earth element-rich inclusion and a heavy rare earth element-rich inclusion as a hydrochloric acid solution and a residue, respectively.

Example 4: Separation of Light Rare Earth Elements (Nd, Pr) and Heavy Rare Earth Element (Dy) (No. 3)

The same experiment as in Example 1 was performed, except that acetic anhydride was used in place of oxalic acid dihydrate used in step 3 and step 6 of Example 1. As a result, as in Example 1, it was possible to obtain a light rare earth element-rich inclusion and a heavy rare earth element-rich inclusion as a hydrochloric acid solution and a residue, respectively.

Example 5: Separation of Light Rare Earth Elements (Nd, Pr) and Heavy Rare Earth Element (Dy) (No. 4)

The same experiment as in Example 1 was performed, except that sodium carbonate was used in place of oxalic acid dihydrate used in step 3 and step 6 of Example 1. As a result, as in Example 1, it was possible to obtain a light rare earth element-rich inclusion and a heavy rare earth element-rich inclusion as a hydrochloric acid solution and a residue, respectively.

Example 6: Separation of Light Rare Earth Elements (Nd, Pr) and Heavy Rare Earth Elements (Dy, Tb) (Model Experiment)

Figure 5:
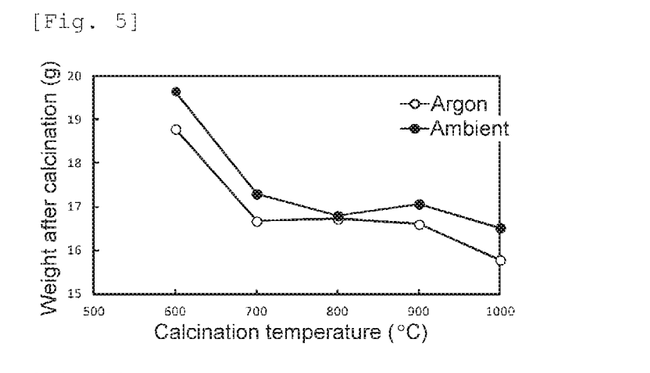
FIG. 5 A graph showing the relation between the calcination temperature of the precipitate and the weight of the obtained calcine in Example 6.

A hydrochloric acid solution of the mass B was obtained in the same manner as in step 1 and step 2 of Example 1. In addition, 10 g of a $Tb_4O_7$ reagent was added to 100 mL of hydrochloric acid having a concentration of 1.0 mol/L and stirred at 80° C. for 6 hours, and then the residue was filtered to give a hydrochloric acid solution of Tb. 130 g of oxalic acid dihydrate was added to 1 L of a hydrochloric acid solution prepared by mixing the hydrochloric acid solution of the mass B and the hydrochloric acid solution of Tb in a volume ratio of 9:1, and stirred at room temperature for 2 hours to give about 100 g of a white powdery precipitate having a high moisture content (oxalates of light rare earth elements and heavy rare earth elements). 50 g of the obtained precipitate was placed in an alumina crucible and calcined under ambient atmosphere or argon atmosphere at 600° C. to 1000° C. for 2 hours to give a brown calcine. The relation between the calcination temperature of the precipitate and the weight of the obtained calcine is shown in FIG. 5. As is clear from FIG. 5, it turned out that when the calcination temperature of the precipitate is 700° C. or more, calcination sufficiently proceeds, and the weight of the resulting calcine is stable. In addition, it turned out that when the precipitate is calcined under ambient atmosphere, the weight of the resulting calcine is greater than when calcined under argon atmosphere.

Figure 6:
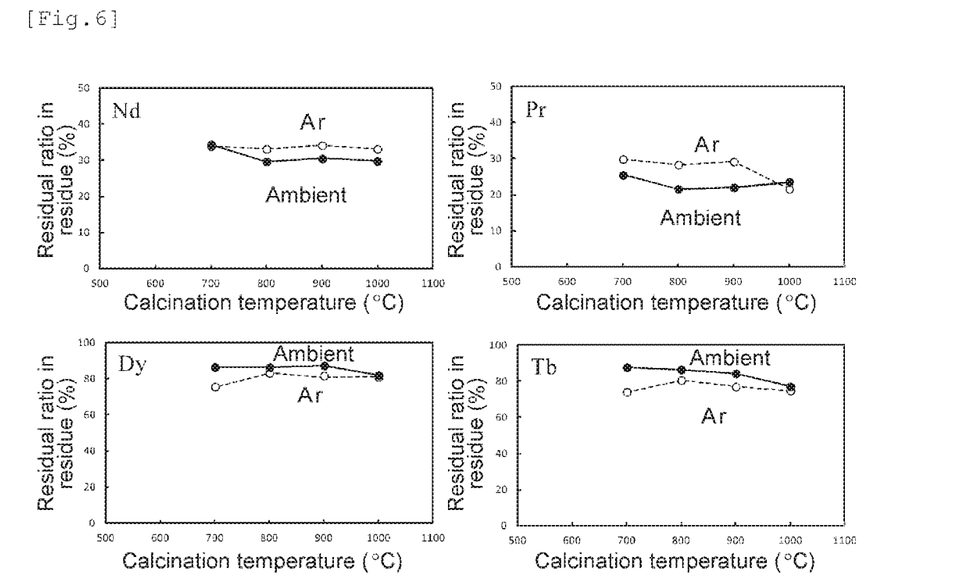
FIG. 6 Similarly, a graph showing the influence of the atmosphere under which a precipitate is calcined on the separability between light rare earth elements and heavy rare earth elements in Example 6.

Next, to 100 mL of hydrochloric acid having a concentration of 1.0 mol/L heated to 60° C., the calcine was added in an amount equivalent to 1.8 times the upper solubility limit (6.54 g) and stirred for 6 hours, and then the residue was filtered to separate a hydrochloric acid solution and the residue. 13 g of oxalic acid dihydrate was added to 100 mL of the obtained hydrochloric acid solution and stirred at room temperature for 2 hours to give a white precipitate, and this precipitate was calcined under ambient atmosphere at 900° C. for 2 hours to give a calcine. In addition, the obtained residue was calcined under ambient atmosphere at 900° C. for 2 hours to give a calcine. With respect to each of the calcine derived from hydrochloric acid solution and the calcine derived from residue, the atmosphere under which the precipitate obtained by adding oxalic acid dihydrate to the hydrochloric acid solution prepared from the hydrochloric acid solution of the mass B and the hydrochloric acid solution of Tb was calcined, the calcination temperature, the weight, and the results of SEM-EDX analysis (only Nd, Pr, Dy, and Tb) are shown in Table 7 and Table 8. In addition, from the amount of each rare earth element contained in the calcine derived from hydrochloric acid solution (a) calculated by multiplying the weight of the calcine derived from hydrochloric acid solution by the content ratio determined by SEM-EDX analysis, and form the amount of each rare earth element contained in the calcine derived from residue (b) calculated by multiplying the weight of the calcine derived from residue by the content ratio determined by SEM-EDX analysis, the residual ratio of each rare earth element in the residue ($(b/(a+b))\times 100$) was examined. The results (the amount of each rare earth element contained in the calcine derived from residue is equivalent to the amount of each rare earth element contained in the residue) are shown in FIG. 6 for each rare earth element.

TABLE 7

| | Calcination Conditions for Precipitate | | Weight of Calcine derived from | SEM-EDX Analysis Results | | | |
|---|---|---|---|---|---|---|---|
| | Atmosphere | Temperature (° C.) | Hydrochloric Acid Solution | (Unit: mass %) | | | |
| | | | | Nd | Pr | Dy | Tb |
| Calcine derived from Hydrochloric Acid Solution | Ambient | 700 | 5.69 g | 60.4 | 21.2 | 2.6 | 2.4 |
| | | 800 | 5.85 g | 60.2 | 21.2 | 2.5 | 2.4 |
| | | 900 | 5.99 g | 59.7 | 20.1 | 2.4 | 2.9 |
| | | 1000 | 6.08 g | 58.0 | 19.4 | 3.4 | 4.1 |
| | Argon | 700 | 5.88 g | 56.1 | 18.2 | 5.4 | 5.4 |
| | | 800 | 5.83 g | 58.0 | 19.2 | 3.8 | 4.1 |
| | | 900 | 5.89 g | 52.4 | 17.4 | 4.1 | 4.7 |
| | | 1000 | 5.96 g | 57.7 | 19.5 | 4.2 | 5.1 |

TABLE 8

| | Calcination Conditions for Precipitate | | Weight of Calcine derived from | SEM-EDX Analysis Results | | | |
|---|---|---|---|---|---|---|---|
| | Atmosphere | Temperature (° C.) | Residue | (Unit: mass %) | | | |
| | | | | Nd | Pr | Dy | Tb |
| Calcine derived from Residue | Ambient | 700 | 4.89 g | 34.8 | 9.3 | 20.2 | 18.7 |
| | | 800 | 5.03 g | 33.3 | 8.8 | 21.6 | 19.7 |
| | | 900 | 4.92 g | 32.6 | 9.6 | 22.0 | 19.2 |
| | | 1000 | 4.30 g | 39.8 | 7.4 | 24.8 | 21.2 |
| | Argon | 700 | 5.03 g | 35.9 | 8.2 | 19.0 | 19.1 |
| | | 800 | 4.54 g | 32.8 | 7.5 | 20.3 | 20.0 |
| | | 900 | 4.85 g | 32.4 | 7.0 | 20.3 | 19.5 |
| | | 1000 | 4.62 g | 32.5 | 7.9 | 20.5 | 18.2 |

As is clear from Table 7, Table 8, and FIG. 6, it turned out that in the calcine derived from hydrochloric acid solution, Nd and Pr, which are light rare earth elements, are contained in large amounts, while in the calcine derived from residue, Dy and Tb, which are heavy rare earth elements, are contained in large amounts, and also that by separating the hydrochloric acid solution and the residue, a light rare earth element-rich inclusion and a heavy rare earth element-rich inclusion can be obtained as the hydrochloric acid solution and the residue, respectively. In addition, it turned out that in the case where the atmosphere under which the precipitate obtained by adding oxalic acid dihydrate to the hydrochloric acid solution prepared from the hydrochloric acid solution of the mass B and the hydrochloric acid solution of Tb is calcined is ambient atmosphere, a light rare earth element-rich inclusion and a heavy rare earth element-rich inclusion can be obtained more effectively than in the case of argon atmosphere. It was surmised that the above results are attributable to the following. The state of oxidation of a rare earth element by calcination varies depending on the atmosphere under which the precipitate is calcined; the oxidation valence of a rare earth element is higher when calcination is performed under ambient atmosphere than when performed under argon atmosphere, and this contributes to improvement in the separability between light rare earth elements and heavy rare earth elements.

Example 7: Characteristics of Content Ratio Between Light Rare Earth Elements and Heavy Rare Earth Elements Contained in Light Rare Earth Element-Rich Inclusion Obtained as Hydrochloric Acid Solution (Model Experiment No. 1)

343 g of an $Nd_2O_3$ reagent, 93 g of a $Pr_6O_{11}$ reagent, 53 g of a $Dy_2O_3$ reagent, and 7 g of a $Tb_4O_7$ reagent were added to 5400 mL, 1450 mL, 750 mL, and 100 mL of hydrochloric acid having a concentration of 1.0 mol/L heated to 60° C., respectively, and stirred for 6 hours to give hydrochloric acid solutions of the respective rare earth elements. The prepared hydrochloric acid solutions of the respective rare earth elements were mixed in the proportions shown in Table 9 to give seven kinds of hydrochloric acid solutions having different rare earth element concentrations (Solutions A to G).

195 g of oxalic acid dihydrate was added to 1.5 L of each of the produced seven kinds of hydrochloric acid solutions, and stirred at room temperature for 2 hours to give a white powdery precipitate having a high moisture content (oxalates of light rare earth elements and heavy rare earth elements). The obtained precipitates were each placed in an alumina crucible and calcined under ambient atmosphere at 900° C. for 2 hours to give seven kinds of brown calcines having different compositions (calcines A to G). The weight of each calcine, the results of SEM-EDX analysis, and the content ratio ($W_{HR}/W_{LR}$) between light rare earth elements (Nd, Pr) and heavy rare earth elements (Dy, Tb) are shown in Table 10. Incidentally, X-ray diffraction analysis was separately performed to confirm that each calcine was a composite oxide or mixture of oxides of light rare earth elements and heavy rare earth elements.

TABLE 10

|  | Calcine A | Calcine B | Calcine C | Calcine D | Calcine E | Calcine F | Calcine G |
| --- | --- | --- | --- | --- | --- | --- | --- |
| Weight (g) | 94.1 | 94.2 | 92.9 | 95.7 | 95.3 | 90.8 | 91.1 |
| Nd (mass %) | 57.8 | 57.7 | 60.2 | 61.3 | 62.8 | 52.7 | 72.5 |
| Pr (mass %) | 13.3 | 13.8 | 14.6 | 14.3 | 14.4 | 24.4 | 6.2 |
| Dy (mass %) | 10.6 | 9.5 | 8.0 | 6.5 | 5.2 | 7.0 | 4.5 |
| Tb (mass %) | 0 | 0.7 | 1.1 | 0.1 | 1.2 | 1.1 | 1.0 |
| $W_{HR}/W_{LR}$ | 0.15 | 0.14 | 0.12 | 0.09 | 0.08 | 0.11 | 0.07 |

The seven kinds of calcines were each added to 100 mL of hydrochloric acid having a concentration of 1.0 mol/L heated to 60° C. in amounts equivalent to 0.8 times, 1.0 time, 1.2 times, 1.5 times, 2.0 times, 2.5 times, and 3.0 times the upper solubility limit (1/15 of the weight of the calcine) and stirred for 6 hours, and then the residue was filtered to separate a hydrochloric acid solution and the residue. 13 g of oxalic acid dihydrate was added to 100 mL of the obtained hydrochloric acid solution and stirred at room temperature for 2 hours to give a white precipitate, and this precipitate was calcined under ambient atmosphere at 900° C. for 2 hours to give a calcine. From the weight of each calcine and the results of SEM-EDX analysis, the content ratio between light rare earth elements and heavy rare earth elements contained in the calcine ($W_{HR}/W_{LR}$: equivalent to the content ratio between light rare earth elements and heavy rare earth elements contained in the hydrochloric acid solution) was examined. The results are shown in Table 11 (the case where the amount added is 2.5 times the upper solubility limit) and FIG. 7 (the content ratio at the 0.0-fold addition means the content ratio in each of the seven kinds of calcines). As is clear from Table 11 and FIG. 7, it turned out that although the content ratio between light rare earth elements and heavy rare earth elements contained in the seven kinds of calcines varied within a range of 0.07 to 0.15 (Table 10), in all the calcines, when the amount added is not less than 2.0 times the upper solubility limit, the content ratio between light rare earth elements and heavy rare earth elements contained in the calcine derived from hydrochloric

TABLE 9

|  | Solution A | Solution B | Solution C | Solution D | Solution E | Solution F | Solution G |
| --- | --- | --- | --- | --- | --- | --- | --- |
| $Nd_2O_3$ Solution | 1011 | 1041 | 1071 | 1100 | 1130 | 905 | 1249 |
| $Pr_6O_{11}$ Solution | 264 | 272 | 279 | 287 | 295 | 466 | 118 |
| $Dy_2O_3$ Solution | 208 | 173 | 138 | 104 | 69 | 121 | 78 |
| $Tb_4O_7$ Solution | 17 | 14 | 12 | 9 | 6 | 11 | 10 |

Figure 7:
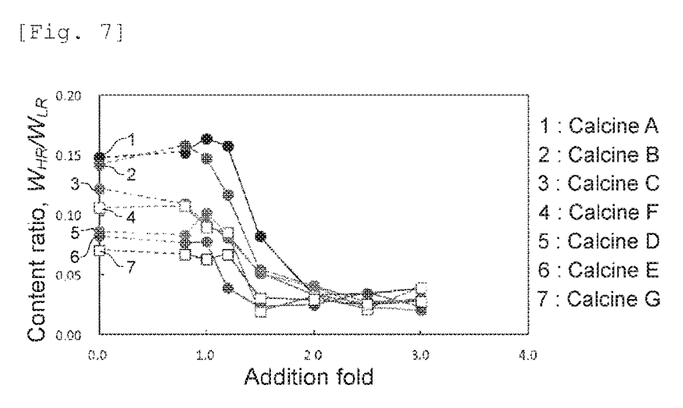
FIG. 7 A graph showing the relation between the amount of calcine added to hydrochloric acid and the content ratio between light rare earth elements and heavy rare earth elements contained in a calcine derive form hydrochloric acid solution in Example 7.

(Unit: mL)

acid solution falls within a range of 0.02 to 0.04 (variation width: 0.08→0.02). Incidentally, the phenomenon that the content ratio between light rare earth elements and heavy rare earth elements contained in the calcine derived from hydrochloric acid solution falls within a range of 0.02 to 0.04 when the amount added is not less than 2.0 times the upper solubility limit was seen even at different hydrochloric acid concentrations (confirmed with hydrochloric acid having a concentration of 0.7 mol/L and hydrochloric acid having a concentration of 1.5 mol/L). In addition, it was confirmed that by subjecting the hydrochloric acid solution, which is a light rare earth element-rich inclusion, to a solvent extraction method by a method known per se, the light rare earth elements and the heavy rare earth elements contained in the hydrochloric acid solution can be separated, and also that by subjecting the residue, which is a heavy rare earth element-rich inclusion, separated from the hydrochloric acid solution, which is a light rare earth element-rich inclusion, to the same steps as steps 2 to 6 of Example 1, the amount of light rare earth elements contained in the residue can be reduced (the content ratio of the heavy rare earth elements to the light rare earth elements can be further increased).

TABLE 11

| Calcine derived from Hydrochloric Acid Solution | | | | | | |
|---|---|---|---|---|---|---|
| A | B | C | D | E | F | G |
| $W_{HR}/W_{LR}$ 0.03 | 0.03 | 0.03 | 0.02 | 0.04 | 0.02 | 0.03 |

Example 8: Characteristics of Content Ratio Between Light Rare Earth Elements and Heavy Rare Earth Elements Contained in Light Rare Earth Element-Rich Inclusion Obtained as Hydrochloric Acid Solution (Model Experiment No. 2)

A mass B was obtained in the same manner as in step 1 of Example 1. The obtained mass B was ground with a mortar made of tungsten carbide and a pestle made of agate, and a powder having a particle size of less than 125 μm was obtained using a screen made of stainless steel; this operation was performed several times, thereby preparing a powder of the mass B. An excess of the powder of the mass B thus prepared was added to hydrochloric acid having a concentration of 1.0 mol/L heated to 60° C. and stirred for 6 hours, and then the residue was filtered to give a saturated hydrochloric acid solution of the mass B. In addition, an excess of a $Tb_4O_7$ reagent was added to hydrochloric acid having a concentration of 1.0 mol/L heated to 60° C. and stirred for 6 hours, and then the residue was filtered to give a saturated hydrochloric acid solution of Tb. 130 g of oxalic acid dihydrate was added to 1 L of a hydrochloric acid solution prepared by mixing the saturated hydrochloric acid solution of the mass B and the saturated hydrochloric acid solution of Tb in a volume ratio of 10:1, and stirred at room temperature for 2 hours to give a white powdery precipitate having a high moisture content (oxalates of light rare earth elements and heavy rare earth elements). The obtained precipitate was placed in an alumina crucible and calcined under ambient atmosphere at 900° C. for 2 hours to give 65.4 g of a brown calcine. The results of SEM-EDX analysis of the obtained calcine and the content ratio ($W_{HR}/W_{LR}$) between light rare earth elements (Nd, Pr) and heavy rare earth elements (Dy, Tb) are shown in Table 12. Incidentally, X-ray diffraction analysis was separately performed to confirm that the obtained calcine was a composite oxide or mixture of oxides of light rare earth elements and heavy rare earth elements.

TABLE 12

| | Nd (mass %) | Pr (mass %) | Dy (mass %) | Tb (mass %) | $W_{HR}/W_{LR}$ |
|---|---|---|---|---|---|
| Calcine | 50.4 | 13.9 | 13.2 | 6.0 | 0.30 |

Figure 8:
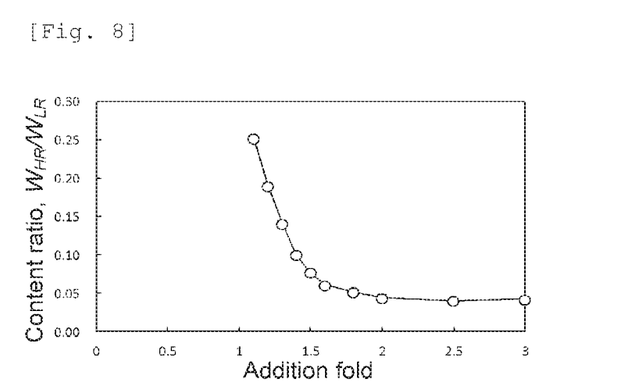
FIG. 8 A graph showing the relation between the amount of calcine added to hydrochloric acid and the content ratio between light rare earth elements and heavy rare earth elements contained in a calcine derive form hydrochloric acid solution in Example 8.

Next, to 100 mL of hydrochloric acid having a concentration of 1.0 mol/L heated to 60° C., the calcine was added in amounts equivalent to 1.1 times, 1.2 times, 1.3 times, 1.4 times, 1.5 times, 1.6 times, 1.8 times, 2.0 times, 2.5 times, and 3.0 times the upper solubility limit (6.54 g) and stirred for 6 hours, and then the residue was filtered to separate a hydrochloric acid solution and the residue. 13 g of oxalic acid dihydrate was added to 100 mL of the obtained hydrochloric acid solution and stirred at room temperature for 2 hours to give a white precipitate, and this precipitate was calcined under ambient atmosphere at 900° C. for 2 hours to give a calcine. From the weight of each calcine and the results of SEM-EDX analysis, the content ratio between light rare earth elements and heavy rare earth elements contained in the calcine ($W_{HR}/W_{LR}$: equivalent to the content ratio between light rare earth elements and heavy rare earth elements contained in the hydrochloric acid solution) was examined. The results are shown in FIG. 8. As is clear from FIG. 8, it turned out that when the amount added is not less than 2.0 times the upper solubility limit, the content ratio between light rare earth elements and heavy rare earth elements contained in the calcine derived from hydrochloric acid solution is 0.04.

INDUSTRIAL APPLICABILITY

The present invention can provide a method useful for separating a light rare earth element and a heavy rare earth element, which, for example, when a light rare earth element and a heavy rare earth element are separated from a workpiece containing a light rare earth element and a heavy rare earth element by a solvent extraction method, makes it possible to reduce the amount of extractant or organic solvent used or downsize the apparatus, or makes it possible to reduce the work burden on the process, such as the analysis of the content ratio between the light rare earth element and the heavy rare earth element contained in the workpiece. In this respect, the present invention is industrially applicable.

The invention claimed is:
1. A method for obtaining a light rare earth element-rich inclusion and a heavy rare earth element-rich inclusion from a composite oxide of the light rare earth element and the heavy rare earth element or a mixture of an oxide of the light rare earth element and an oxide of the heavy rare earth element in order to separate the two, characterized by including at least:
   (1) a step of dissolving a composite oxide of the light rare earth element and the heavy rare earth element or a mixture of an oxide of the light rare earth element and an oxide of the heavy rare earth element in hydrochloric acid and/or nitric acid;
   (2) a step of adding a precipitant to the obtained solution to give a precipitate;
   (3) a step of calcining the obtained precipitate;

(4) a step of adding the obtained calcine in an amount of 1.1 times to 3.0 times the upper solubility limit to hydrochloric acid and/or nitric acid having a concentration of 0.7 mol/L or more to give a solution and a residue; and (5) a step of separating the obtained solution and residue, thereby giving the solution as a light rare earth element-rich inclusion and the residue as a heavy rare earth element-rich inclusion, wherein the term "rich" means that the content ratio of the concerned rare earth element to the other rare earth element is higher than the content ratio in the composite oxide of the light rare earth element and the heavy rare earth element or the mixture of an oxide of the light rare earth element and an oxide of the heavy rare earth element.

2. A method for obtaining a light rare earth element-rich inclusion and a heavy rare earth element-rich inclusion from a workpiece containing a light rare earth element and a heavy rare earth element in order to separate the two, characterized by including at least:

(1) a step of obtaining, from a workpiece containing a light rare earth element and a heavy rare earth element, a composite oxide of the light rare earth element and the heavy rare earth element or a mixture of an oxide of the light rare earth element and an oxide of the heavy rare earth element;

(2) a step of dissolving the obtained composite oxide of the light rare earth element and the heavy rare earth element or the mixture of an oxide of the light rare earth element and an oxide of the heavy rare earth element in hydrochloric acid and/or nitric acid;

(3) a step of adding a precipitant to the obtained solution to give a precipitate;

(4) a step of calcining the obtained precipitate;

(5) a step of adding the obtained calcine in an amount of 1.1 times to 3.0 times the upper solubility limit to hydrochloric acid and/or nitric acid having a concentration of 0.7 mol/L or more to give a solution and a residue; and (6) a step of separating the obtained solution and residue, thereby giving the solution as a light rare earth element-rich inclusion and the residue as a heavy rare earth element-rich inclusion, wherein the term "rich" means that the content ratio of the concerned rare earth element to the other rare earth element is higher than the content ratio in the workpiece.

3. The method according to claim 2, characterized in that at least one member selected from oxalic acid, acetic acid, and a metal salt of carbonic acid is used as the precipitant.

4. The method according to claim 2, characterized in that the workpiece is an R—Fe—B based permanent magnet.

5. The method according to claim 2, characterized in that the content ratio between the light rare earth element and the heavy rare earth element contained in the workpiece, wherein the content ratio is defined as the weight of the heavy rare earth element/the weight of the light rare earth element, is 0.05 to 0.50.

6. The method according to claim 2, characterized in that the content ratio between a light rare earth element and a heavy rare earth element contained in the solution that serves as a light rare earth element-rich inclusion, wherein the content ratio is defined as the concentration of the heavy rare earth element/the concentration of the light rare earth element, is 0.02 to 0.05, and the content ratio is 0.01 or more smaller than the content ratio between the light rare earth element and the heavy rare earth element contained in the workpiece.

* * * * *